United States Patent
Khare et al.

(10) Patent No.: US 10,635,767 B2
(45) Date of Patent: Apr. 28, 2020

(54) GLITCH DETECTION AT CLOCK DOMAIN CROSSING

(71) Applicant: Mentor Graphics Corporation, Wilsonville, OR (US)

(72) Inventors: Sulabh Kumar Khare, Noida (IN); Ashish Hari, Noida (IN)

(73) Assignee: Mentor Graphics Corporation, Wilsonville, OR (US)

( * ) Notice: Subject to any disclaimer, the term of this patent is extended or adjusted under 35 U.S.C. 154(b) by 97 days.

(21) Appl. No.: 15/885,117

(22) Filed: Jan. 31, 2018

(65) Prior Publication Data

US 2018/0225400 A1    Aug. 9, 2018

(30) Foreign Application Priority Data

Jan. 31, 2017   (IN) .............................. 201741003545

(51) Int. Cl.
    *G06F 17/50*    (2006.01)
(52) U.S. Cl.
    CPC ........ *G06F 17/5031* (2013.01); *G06F 17/504* (2013.01); *G06F 2217/02* (2013.01); *G06F 2217/84* (2013.01)
(58) Field of Classification Search
    CPC .............. G06F 17/5031; G06F 17/504; G06F 2217/84; G06F 2217/02
    USPC .......................................... 716/106–115, 136
    See application file for complete search history.

(56) References Cited

U.S. PATENT DOCUMENTS

| | | | | |
|---|---|---|---|---|
| 6,532,574 | B1* | 3/2003 | Durham | G06F 1/10 327/292 |
| 2005/0268265 | A1* | 12/2005 | Ly | G06F 17/5022 716/108 |
| 2010/0199244 | A1* | 8/2010 | Kwok | G06F 17/504 716/113 |
| 2015/0161315 | A1* | 6/2015 | Meil | G06F 17/5031 716/108 |

* cited by examiner

*Primary Examiner* — Nghia M Doan
(74) *Attorney, Agent, or Firm* — Mentor Graphics Corporation

(57) ABSTRACT

This application discloses a computing system to perform one or more static checks on clock domain crossings in a circuit design to detect combinational logic configured to generate output signals having glitches that cross clock domains in a circuit design. The computing system can identify the combinational logic is configured to generate the output signal based, at least in part, on an input signal and an inversion of the input signal. The computing system can identify conditions that, when satisfied, allow the combinational logic to generate the output signal based, at least in part, on the input signal and the inversion of the input signal, and generate a glitch expression based, at least in part, on the identified conditions. The computing system can determine the combinational logic is configured to generate at least one glitch in the output signal based, at least in part, on the glitch expression.

17 Claims, 7 Drawing Sheets

STATIC '0' CONFIGURATION

EXPRESSION = $X\bar{X}$

STATIC '1' CONFIGURATION

EXPRESSION = $X+\bar{X}$

DYNAMIC CONFIGURATION

EXPRESSION = $X\bar{X}+X$

DYNAMIC CONFIGURATION

EXPRESSION = $(X+\bar{X})X$

GLITCH DETECTION AT CLOCK DOMAIN CROSSING

RELATED APPLICATIONS

This claims priority under § 119 to Indian Patent Application No. 201741003545, entitled "GLITCH DETECTION AT CLOCK DOMAIN CROSSING," filed Jan. 31, 2017, which is incorporated herein by reference in its entirety.

TECHNICAL FIELD

This application is generally related to electronic design automation and, more specifically, to glitch detection at clock domain crossings in a circuit design.

BACKGROUND

Designing and fabricating electronic systems typically involves many steps, known as a "design flow." The particular steps of a design flow often are dependent upon the type of electronic system to be manufactured, its complexity, the design team, and the fabricator or foundry that will manufacture the electronic system from a design. Typically, software and hardware "tools" verify the design at various stages of the design flow by running simulators, hardware emulators, and/or formal techniques, and errors in the design are corrected or the design is otherwise improved.

Initially, a specification for a new electronic system can be transformed into a logical design, sometimes referred to as a register transfer level (RTL) description of the circuit. With this logical design, the electronic system can be described in terms of both the exchange of signals between hardware registers and the logical operations that can be performed on those signals. The logical design typically employs a Hardware Description Language (HDL), such as System Verilog or Very high speed integrated circuit Hardware Description Language (VHDL).

The logic of the electronic system can be analyzed to confirm that it will accurately perform the functions desired for the electronic system, sometimes referred to as "functional verification." A design verification tool can perform functional verification operations, such as simulating, emulating, and/or formally verifying the logical design. For example, when the design verification tool simulates the logical design, the design verification tool can provide transactions or sets of test vectors, for example, generated by a simulated test bench, to the simulated logical design. The design verification tool can determine how the simulated logical design responded to the transactions or test vectors, and verify, from the results of the simulation, that the logical design describes circuitry to accurately perform functions.

As circuits and their corresponding logical designs become more complex, the task of functional verification becomes increasingly difficult to manage and accomplish. For example, this complexity can include logical designs including multiple power domains, multiple clock domains, multiple different types of resets having various characteristics, or the like. Given this complexity, many "bugs" or design flaws can be left unexposed by conventional simulation. One such "bug" can occur when signals crossing clock domains include glitches, or temporary spikes in signal value corresponding to an incorrect value. These signal glitches, when crossing clock domains, may be captured or latched by a register, which can cause logic failures.

Verification engineers have attempted to identify a presence of combinational logic capable of inducing the glitches in signals traversing between clock domains in a variety of ways. For example, the verification engineers can sample the signal path crossing between clock domains during simulation, and then utilize the samples to identify a presence of glitches in the signal path. Due the asynchronous nature of signal paths crossing clock domains, many simulators have difficulty sampling the signal paths at the times when glitches may be present. Some verification engineers have elected to write assertions to check if the simulators are sampling the signal paths at the correct time, but the results of sampling checks are often not accurately captured by the simulator.

Verification engineers have also performed static checks on the circuit design to identify portions of the circuit design that may be susceptible to inducing glitches in signals traversing a clock domain crossing. These static checks typically include flagging every clock domain crossing that contains combinational logic in its path in the circuit design for manual inspection by the verification engineers. While manual inspection can identify combinational logic capable of inducing signal glitches, the procedure is error-prone and time-consuming.

SUMMARY

This application discloses a computing system implementing a design verification tool to perform one or more static checks on clock domain crossings in a circuit design to detect combinational logic configured to generate output signals having glitches that cross clock domains in a circuit design. The computing system implementing the design verification tool can identify the combinational logic is configured to generate the output signal based, at least in part, on an input signal and an inversion of the input signal. The computing system implementing the design verification tool can identify conditions that, when satisfied, allow the combinational logic to generate the output signal based, at least in part, on the input signal and the inversion of the input signal, and generate a glitch expression based, at least in part, on the identified conditions. The computing system implementing the design verification tool can determine the combinational logic is configured to generate at least one glitch in the output signal based, at least in part, on the glitch expression. Embodiments will be described below in greater detail.

DETAILED DESCRIPTION

Illustrative Operating Environment

Figure 1:
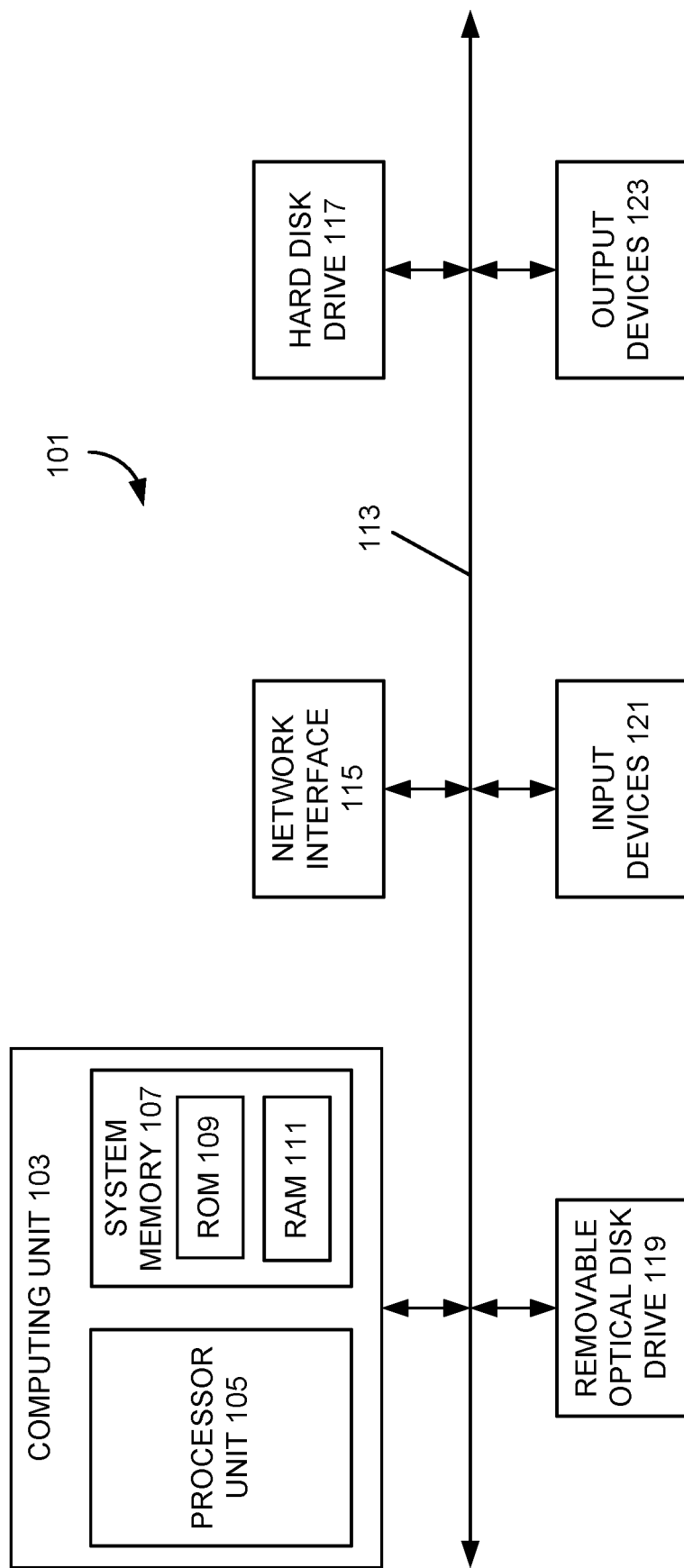
FIGS. 1 and 2 illustrate an example of a computer system of the type that may be used to implement various embodiments.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
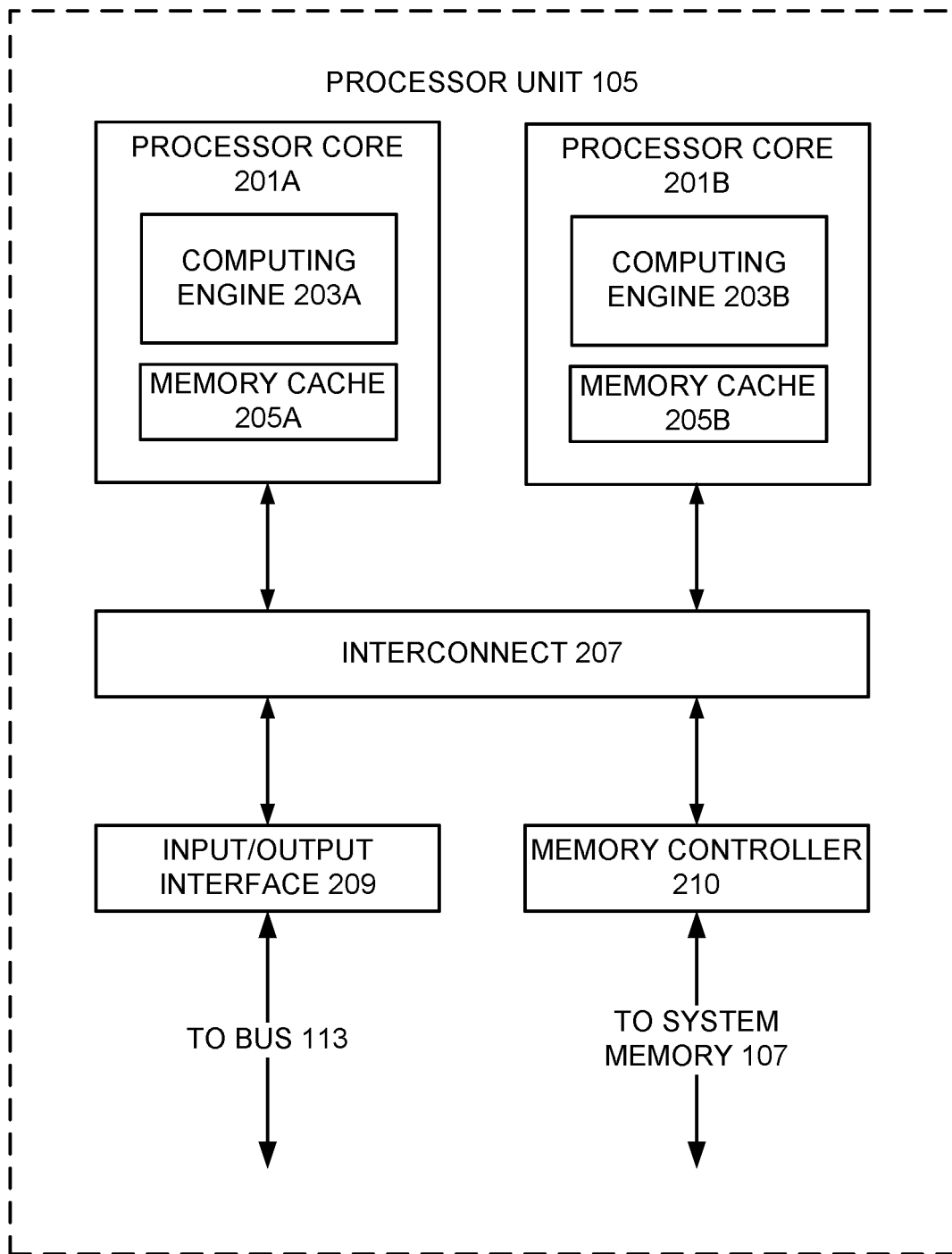

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Glitch Detection at Clock Domain Crossing

Figure 3:
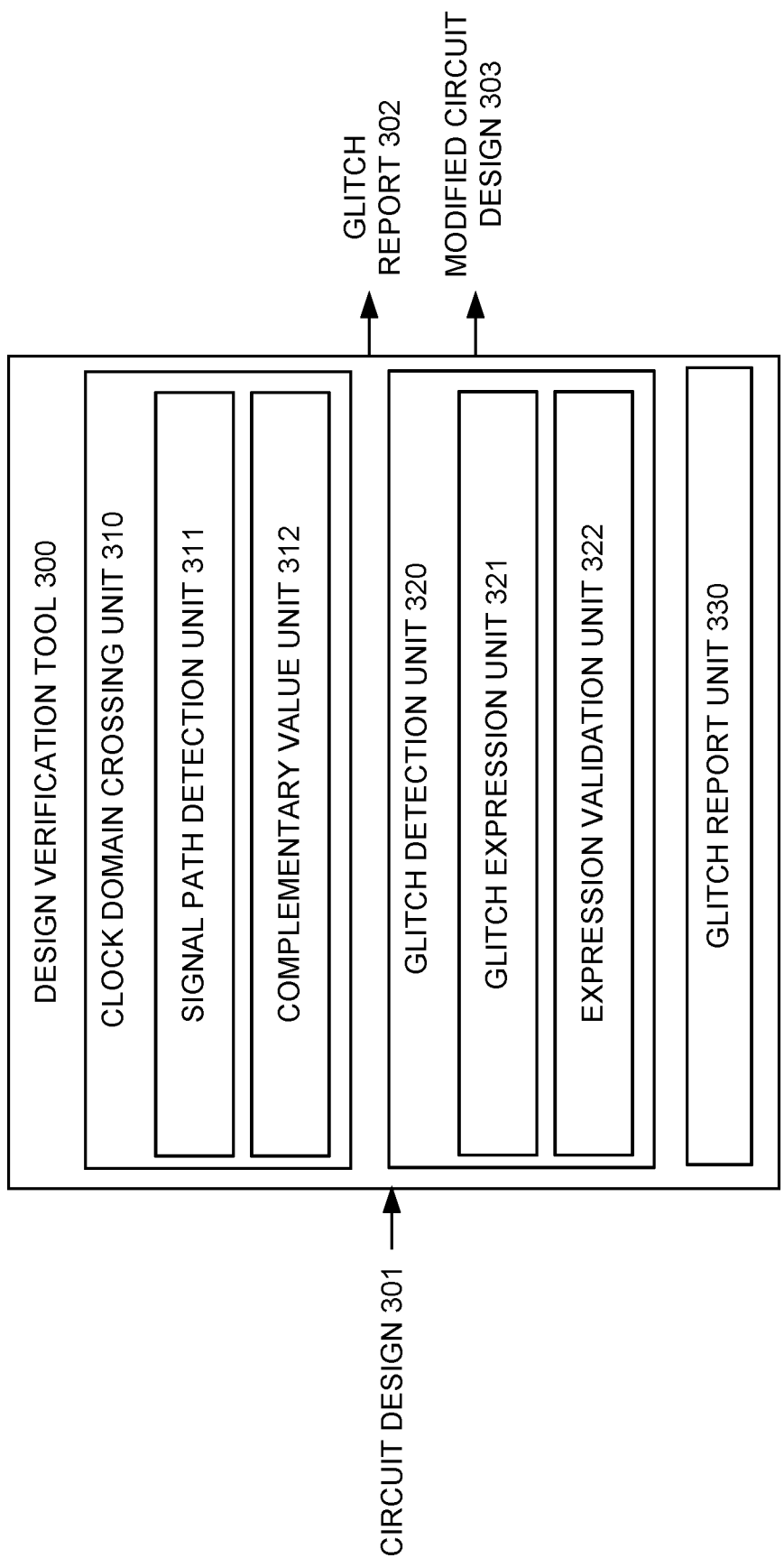
FIG. 3 illustrates an example of a design verification tool to perform clock domain crossing glitch detection in a circuit design implemented according to various embodiments.
Figure 4:
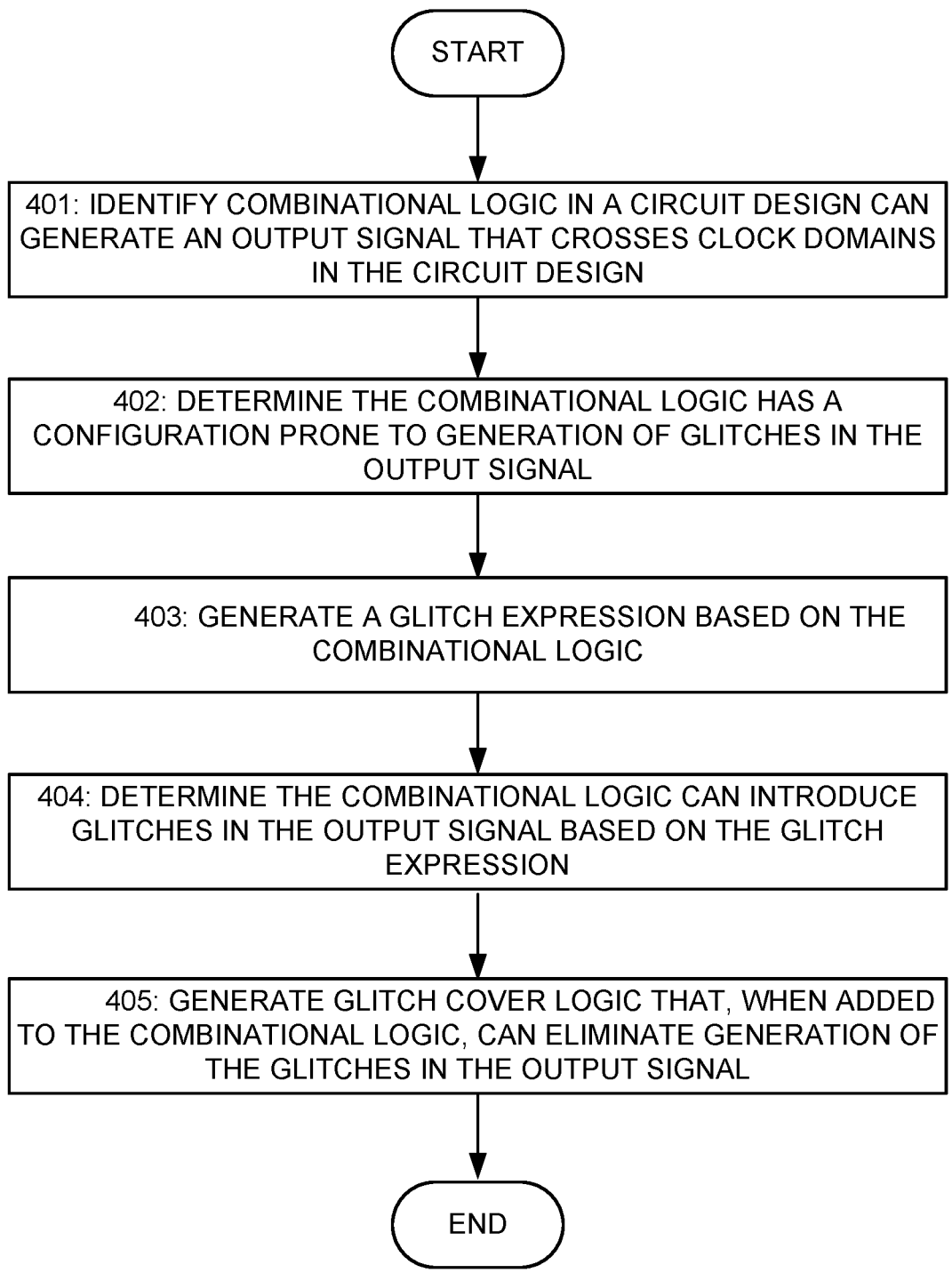
FIG. 4 illustrates a flowchart showing an example implementation of clock domain crossing glitch detection in a circuit design according to various embodiments.

FIG. 3 illustrates an example of a design verification tool 300 to perform clock domain crossing glitch detection in a circuit design 301 implemented according to various embodiments, and FIG. 4 illustrates a flowchart showing an example implementation of clock domain crossing glitch detection in the circuit design 301 according to various embodiments. Referring to FIGS. 3 and 4, the design verification tool 300 can receive the circuit design 301, such as a netlist, which can model an electronic device at one or more levels of abstraction, such as a gate-level, schematic-level, or transistor-level, and can describe the electronic device as groups of parts, devices, gates, or expressions along with their associated connectivity.

In some embodiments, the circuit design 301 can be a logical design modeling the electronic device at a register transfer level (RTL), for example, with code in a hardware description language (HDL), such as Verilog, Very high speed integrated circuit Hardware Description Language (VHDL), or the like. The logical design can describe the electronic device both in terms of an exchange of data signals between components in the electronic device, such as hardware registers, flip-flops, combinational logic, or the like, and in terms of logical operations that can be performed on the data signals in the electronic device. The design verification tool 300, in some embodiments, can synthesize the netlist from the logical design.

The design verification tool 300 can include a clock domain crossing unit 310 to identify combinational logic described in the circuit design 301 having configurations prone to inducing glitches in output signals driven through clock domain crossings. Each of the glitches in an output signal can correspond to an unintended value-level in the output signal, such as a temporary voltage spike, which may be caused by due to differences in signal propagation delay through the combinational logic.

In a block 401, the design verification tool 300 can identify combinational logic in the circuit design 301, which can generate an output signal that crosses clock domains in the circuit design 301. In some embodiments, the clock domain crossing unit 310 can include a signal path detection unit 311 to identify signal paths that cross clock domains in the circuit design 301 and analyze the signal paths to detect combinational logic that can drive output signals on the signal paths.

In a block 402, the design verification tool 300 can determine whether the identified combinational logic has a configuration prone to generation of glitches in the output signal. The clock domain crossing unit 310 can include a complementary value unit 312 to determine when the combinational logic can generate an output signal based, at least in part, on both a value of an input signal and a complementary or inverted value of the input signal. In some embodiments, when the combinational logic can generate the output signal based, at least in part, on both the value and the inverted value of the input signal, the complementary value unit 312 can determine the combinational logic has a configuration prone to generation of glitches in the output signal. Some example combinational logic configurations prone to generation of glitches in output signals will be described below in FIGS. 5A-5D.

Figure 5A:
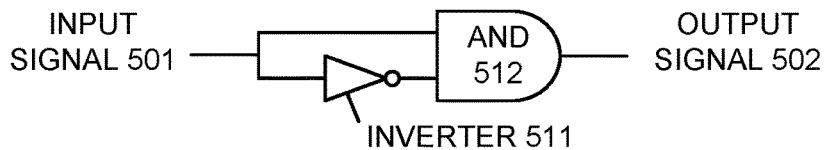
FIGS. 5A-5D illustrate example combinational logic configurations prone to generation of glitches in output signals according to various examples.

FIGS. 5A-5D illustrate example combinational logic configurations prone to generation of glitches in output signals according to various examples. Referring to FIG. 5A, combinational logic can implement a static '0' configuration, which includes an inverter 511 and an AND gate 512. The inverter 511 can receive an input signal 501 and output an inverted version of the input signal 501. The AND gate 512 can receive the input signal 501 and the inverted version of the input signal 501, and perform a logical AND operation on the two received inputs to generate an output signal 502. Since the propagation delay for input signal 501 to the two inputs to the AND gate 512 can differ due to a delay associated with propagation of the input signal 501 through the inverter 511, the output signal 502 can include a glitch that temporarily sets a voltage level of the output signal 502 incorrectly to a high level corresponding to a '1'.

Figure 5B:
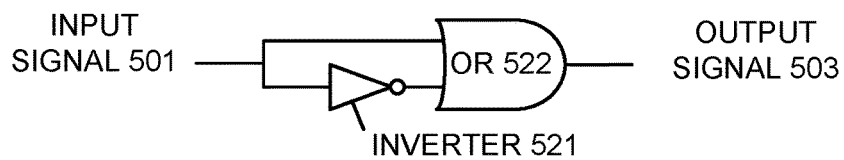

Referring to FIG. 5B, combinational logic can implement a static '1' configuration, which includes an inverter 521 and an OR gate 522. The inverter 521 can receive an input signal 501 and output an inverted version of the input signal 501. The OR gate 522 can receive the input signal 501 and the inverted version of the input signal 501, and perform a logical OR operation on the two received inputs to generate an output signal 503. Since the propagation delay for input signal 501 to the two inputs to the OR gate 522 can differ due to a delay associated with propagation of the input signal 501 through the inverter 521, the output signal 503 can include a glitch that temporarily sets a voltage level of the output signal 503 incorrectly to a low level corresponding to a '0'.

Figure 5C:
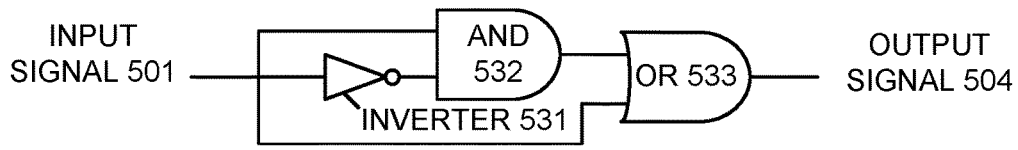

Referring to FIG. 5C, combinational logic can implement a dynamic configuration, which includes an inverter 531, an AND gate 532, and an OR gate 533. The inverter 531 can receive an input signal 501 and output an inverted version of the input signal 501. The AND gate 532 can receive the input signal 501 and the inverted version of the input signal 501, and perform a logical AND operation on the two received inputs to generate an intermediate signal. Since the propagation delay for input signal 501 to the two inputs to the AND gate 532 can differ due to a delay associated with propagation of the input signal 501 through the inverter 531, the intermediate signal can include a glitch that temporarily sets a voltage level of the intermediate signal incorrectly to a high level corresponding to a '1'. The OR gate 533 can receive the input signal 501 and the intermediate signal output from the AND gate 532, and perform a logical OR operation on the two received inputs to generate an output signal 504. Since the intermediate signal includes a glitch, the OR gate 533 can generate the output signal 504 that also includes the glitch.

Figure 5D:
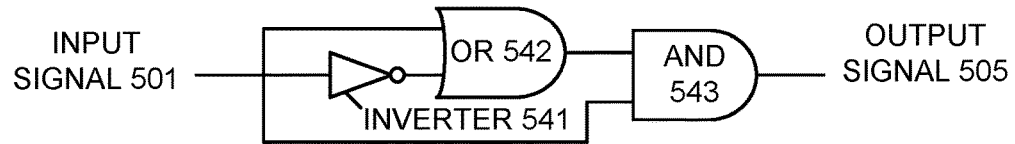

Referring to FIG. 5D, combinational logic can implement a dynamic configuration, which includes an inverter 541, an OR gate 542, and an AND gate 543. The inverter 541 can receive an input signal 501 and output an inverted version of the input signal 501. The OR gate 542 can receive the input signal 501 and the inverted version of the input signal 501, and perform a logical OR operation on the two received inputs to generate an intermediate signal. Since the propagation delay for input signal 501 to the two inputs to the OR gate 542 can differ due to a delay associated with propagation of the input signal 501 through the inverter 541, the intermediate signal can include a glitch that temporarily sets a voltage level of the intermediate signal incorrectly to a high level corresponding to a '0'. The AND gate 543 can receive the input signal 501 and the intermediate signal output from the OR gate 542, and perform a logical AND operation on the two received inputs to generate an output signal 505. Since the intermediate signal includes a glitch, the AND gate 543 can generate the output signal 505 that also includes the glitch.

Referring back to FIG. 3, the design verification tool 300 can include a glitch detection unit 320 to determine which of the identified combinational logic can generate glitches in their corresponding output signals crossing clock domains in the circuit design 301.

In a block 403, the design verification tool 300 can generate a glitch expression based, at least in part, on the combinational logic. The glitch expression can identify one or more conditions that, if satisfied, can allow the combinational logic to generate an output signal based, at least in part, on the value of the input signal and its complementary or inverted value. In some embodiments, the glitch detection unit 320 can include a glitch expression unit 321 to analyze a logical expression of the combinational logic to identify one or more coupled terms in the combinational logic. Each coupled term can correspond to an input signal that can be propagated through the combinational logic in a way that allows the combinational logic to generate an output signal based, at least in part, on both the input signal and an inverted version of the input signal. The glitch expression unit 321 can determine conditions when the input signal and the inverted version of the input signal can propagate through the combinational logic, and build the glitch expression based on the determined conditions. Embodiments of glitch expression generation will be described below in greater detail.

In a block 404, the design verification tool 300 can determine the combinational logic can introduce glitches in the output signal based on the glitch expression. The glitch detection unit 320 can include a glitch validation unit 322 to determine whether the condition(s) in the glitch expression can be satisfied. In some embodiments, the glitch validation unit 322 can implement one or more formal techniques in an attempt to prove or disprove the condition(s) in the glitch expression. The formal techniques can include utilization of a Binary Decision Diagram (BDD), a Boolean Satisfiability (SAT) Solver, an Automatic Test Pattern Generator (ATPG), Cut Point Prover, or the like. When the glitch validation unit 322 determines the condition(s) in the glitch expression can be satisfied, the glitch validation unit 322 can determine the combinational logic can introduce glitches in the output signal. When the glitch validation unit 322 determines the condition(s) in the glitch expression cannot be satisfied, the glitch validation unit 322 can determine the combinational logic does not introduce glitches in the output signal.

The design verification tool 300 can include a glitch report unit 330 to collect information associated with the combinational logic determined to be capable of introducing glitches in an output signal that crosses clock domains. This information can include an identification of a signal path crossing clock domains that can include glitches, the glitch expression, an identification of the combinational logic or a reduced version of the combinational, an identification of signal values capable of allowing the combinational logic to generate the output signal with a glitch, or the like. The glitch report unit 330 can generate a glitch report 302 that includes the collected information.

The glitch report unit 330, for example, as described in a block 405, can identify glitch cover logic that, when added to the combinational logic, can eliminate generation of the glitches in the output signal. In some embodiments, the glitch report unit 330 can utilize the signal values capable of allowing the combinational logic to generate the output signal with a glitch to identify the glitch cover logic. The glitch cover logic can be logically OR'd with the logical expression associated with the combinational logic. The glitch report unit 330 can include the glitch cover logic in the glitch report 302. In some embodiments, the glitch report unit 330 can modify the circuit design 301 to include the glitch cover logic, and output a modified circuit design 303 so the new combinational logic does not generate output signals with glitches.

Figure 6:
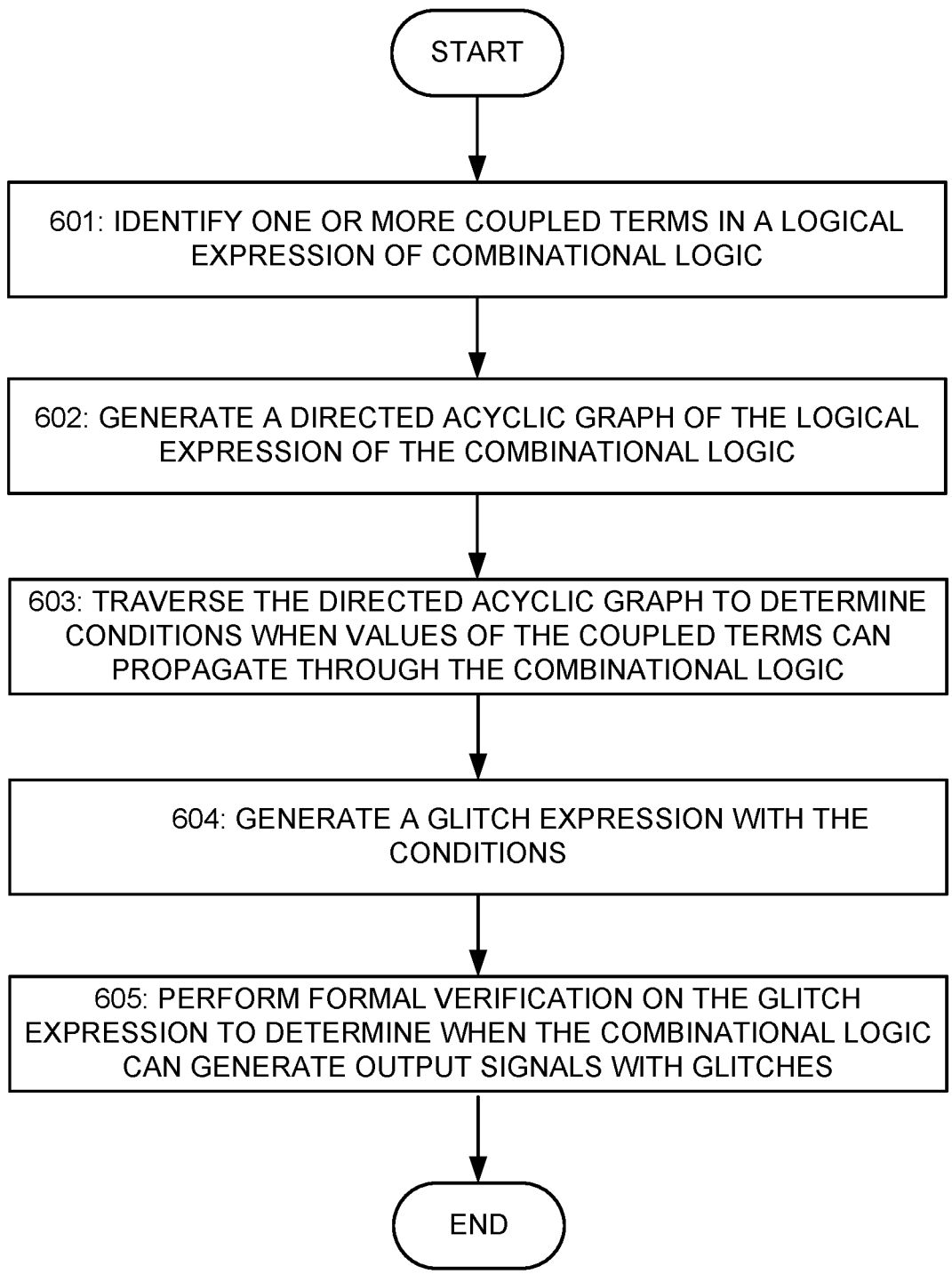
FIG. 6 illustrates a flowchart showing an example implementation of glitch detection flow according to various embodiments.

FIG. 6 illustrates a flowchart showing another example implementation of clock domain crossing glitch detection in a circuit design according to various embodiments. Referring to FIG. 6, in a block 601, a computing system implementing a design verification tool can identify one or more coupled terms in a logical expression of combinational logic. Each coupled term can correspond to an input signal that can be propagated through the combinational logic in a way that allows the combinational logic to generate an output signal based, at least in part, on both the input signal and an inverted version of the input signal.

In some embodiments, the computing system implementing the design verification tool can traverse the logical expression of the combinational logic to identify when the combinational logic can propagate a value and its inversion corresponding to a term in the logical expression. For example, when the combinational logic has a logical expression of $\overline{AB}\overline{X}+AB\overline{X}+AX$, the terms A and X in the logical expression can be identified as coupled terms.

In a block 602, the computing system implementing the design verification tool can generate a directed acyclic graph of the logical expression of the combinational logic. The directed acyclic graph can be a finite directed graph without directed cycles. In some embodiments, vertices of the directed acyclic graph can include terms of the logical expression of the combinational logic or logical operations in the logical expression. The directed acyclic graph can include edges to indicate an operational direction between multiple vertices. The combination of vertices and edges can identify order of logical operations to perform on the terms in the logical expression. An example embodiment of a directed acyclic graph for the logical expression $\overline{AB}\overline{X}+AB\overline{X}+AX$ will be present with reference to FIG. 7.

Figure 7:
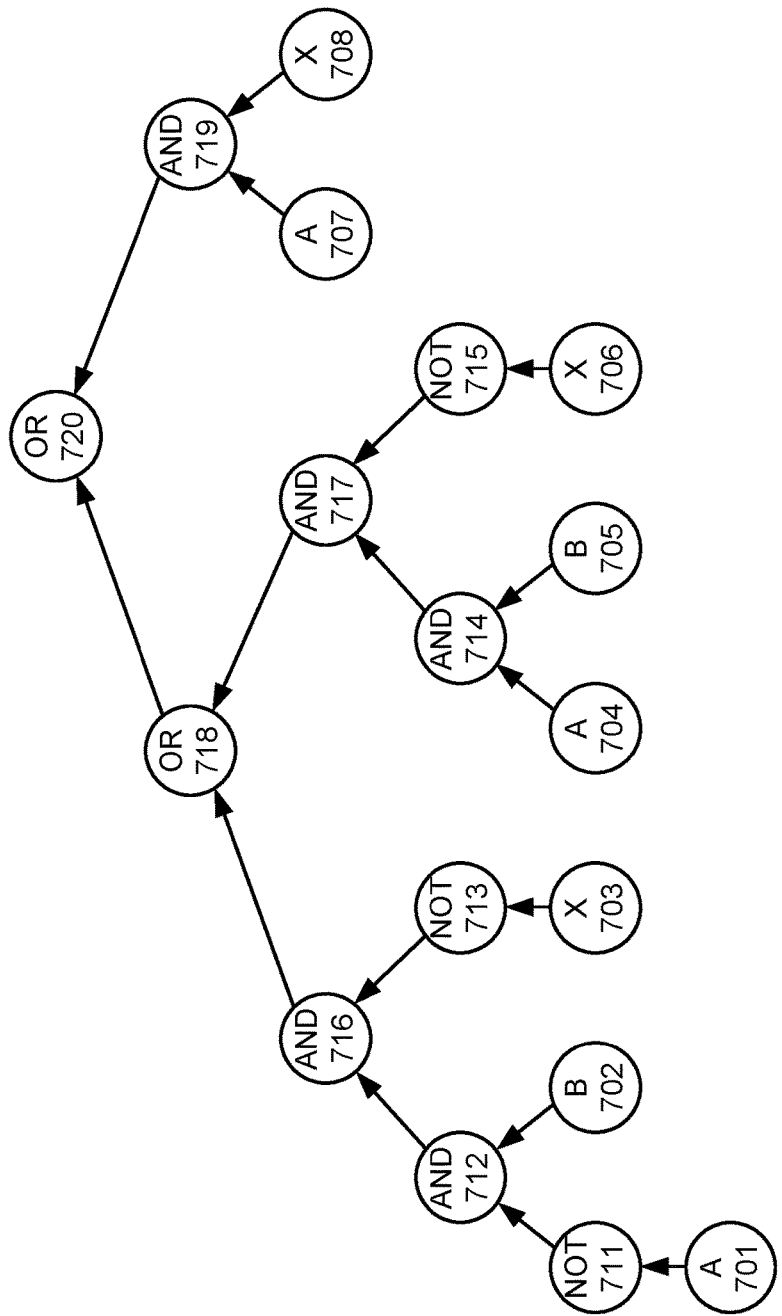
FIG. 7 illustrates an example directed acyclic graph of combinational logic according to various embodiments.

FIG. 7 illustrates an example directed acyclic graph 700 of combinational logic according to various embodiments. Referring to FIG. 7, the directed acyclic graph 700 can represent the logical expression $\overline{AB}\overline{X}+AB\overline{X}+AX$ associated with an example of the combinational logic. The directed acyclic graph 700 can include vertices 701-708 to represent terms in the logical expression and include vertices 711-720 to represent logical operations in the logical expression. For example, the vertices 701-708 can represent the terms A, B, and X in the logical expression, and the vertices 711-720 can represent inversion operations (NOT), logical AND operations (AND), or a logical OR operations (OR) in the logical expression. Each of the vertices 701-708 and 711-720 can be coupled to at least another one of the vertices 701-708 and 711-720 by at least one edge or directed line. The edges or directed lines can identify which terms associated with the vertices 701-708 should undergo which of the logical operations in the vertices 711-720, and in what order.

Referring back to FIG. 6, in a block 603, the computing system implementing the design verification tool can traverse the directed acyclic graph to determine conditions when values of the coupled terms can propagate through the combinational logic. In some embodiments, the computing system implementing the design verification tool can traverse the directed acyclic graph by identifying a coupled term, and determining values of the other terms that allow the couple term to propagate through the logical operation vertices. For example, when a coupled term is logically AND'd with one of the other terms, the traversal of the directed acyclic graph representing this example would determine the other term should have a value of '1'. The value of the other term can be utilized to generate a condition for the coupled term to propagate through the combinational logic, namely, a condition that the other term should have a value of '1'. The computing system implementing the design verification tool can perform this traversal of the directed acyclic graph for all of the coupled terms in the logical expression of the combinational logic.

In the example logical expression $\overline{AB}\overline{X}+AB\overline{X}+AX$ for the combinational logic, the coupled term A can have conditions of X, $B\overline{X}$ for propagating the term, and a condition of $B\overline{X}$ for propagating the inversion of the term. The coupled term X can have a condition of A for propagating the term, and conditions of $A\overline{B}$, AB for propagating the inversion of the term.

In a block 604, the computing system implementing the design verification tool can generate a glitch expression with the conditions. The glitch expression can describe a set of logical conditions that can allow coupled terms to generate an output of the combinational logic. Continuing the above example, for the coupled term A, the computing system implementing the design verification tool can logically OR the conditions X, $B\overline{X}$ for propagating the term and then logically AND the result with the condition $B\overline{X}$ for propagating the inversion of the term, which generates a condition expression for the coupled term A. For the coupled term X, the computing system implementing the design verification tool can logically OR the conditions $A\overline{B}$, AB for propagating the inversion of the term and then logically AND the result with the condition A for propagating the term, which generates a condition expression for the coupled term X. In some embodiments, the computing system implementing the design verification tool can generate separate glitch expressions from the condition expressions for each of the different coupled terms, or can combine the different condition expressions into a single glitch expression, for example, the condition expressions corresponding to each coupled term logically OR'd with each other. In some embodiments, the computing system implementing the design verification tool also can logically reduce the condition expression or the glitch expression.

In a block 605, the computing system implementing the design verification tool can perform formal verification on the glitch expression to determine when the combinational logic can generate output signals with glitches. The computing system implementing the design verification tool can determine whether the condition(s) in the glitch expression can be satisfied. When the glitch expression can be satisfied, the computing system implementing the design verification tool can determine the combinational logic can introduce glitches in the output signal.

In some embodiments, the computing system implementing the design verification tool can perform the formal verification utilizing one or more formal techniques, such as a Binary Decision Diagram (BDD), a Boolean Satisfiability (SAT) Solver, an Automatic Test Pattern Generator (ATPG), Cut Point Prover, or the like. These formal techniques can allow the computing system implementing the design verification tool to attempt to prove or disprove the condition(s) in the glitch expression.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:
1. A method comprising:
   identifying, by a computing system, combinational logic in a circuit design, which is configured to generate an output signal based, at least in part, on an input signal received by the combinational logic and an inversion of the input signal, wherein the output signal generated by the combinational logic is configured to cross between clock domains in the circuit design;

generating, by the computing system, a glitch expression based, at least in part, on a configuration of the combinational logic, wherein the glitch expression includes conditions, the satisfaction of which causes the combinational logic to generate the output signal using both the input signal and the inversion of the input signal; and determining, by the computing system, the combinational logic is configured to generate at least one glitch in the output signal based, at least in part, on the glitch expression.

2. The method of claim 1, wherein generating the glitch expression further comprises identifying the conditions, the satisfaction of which causes the combinational logic to generate the output signal using both the input signal and the inversion of the input signal, wherein generating the glitch expression is based, at least in part, on the identified conditions.

3. The method of claim 2, wherein determining the combinational logic is configured to generate at least one glitch in the output signal further comprises:
performing formal verification operations on the glitch expression; and
determining the combinational logic is configured to generate at least one glitch in the output signal when the formal verification operations indicate the conditions in the glitch expression are capable of being satisfied.

4. The method of claim 1, further comprising generating, by the computing system, a cover expression representing additional logic that, when combined to the combinational logic, eliminates glitches introduced by the combinational logic in the output signal.

5. The method of claim 4, further comprising modifying, by the computing system, the circuit design to combine the additional logic with the combinational logic.

6. The method of claim 1, wherein the glitch in the output signal is an unintended value-level in the output signal due to differences in signal propagation delay through the combinational logic.

7. A system comprising:
a memory device configured to store machine-readable instructions; and
a computing system including one or more processing devices, in response to executing the machine-readable instructions, configured to:
identify combinational logic in a circuit design, which is configured to generate an output signal based, at least in part, on an input signal received by the combinational logic and an inversion of the input signal, wherein the output signal generated by the combinational logic is configured to cross between clock domains in the circuit design;
generate a glitch expression based, at least in part, on a configuration of the combinational logic, wherein the glitch expression includes conditions, the satisfaction of which causes the combinational logic to generate the output signal using both the input signal and the inversion of the input signal; and
determine the combinational logic is configured to generate at least one glitch in the output signal based, at least in part, on the glitch expression.

8. The system of claim 7, wherein the one or more processing devices, in response to executing the machine-readable instructions, are further configured to generate the glitch expression by:
identifying the conditions, the satisfaction of which causes the combinational logic to generate the output signal using both the input signal and the inversion of the input signal; and
generating the glitch expression based, at least in part, on the identified conditions.

9. The system of claim 8, wherein the one or more processing devices, in response to executing the machine-readable instructions, are further configured to determine the combinational logic is configured to generate at least one glitch in the output signal by:
performing formal verification operations on the glitch expression; and
determining the combinational logic is configured to generate at least one glitch in the output signal when the formal verification operations indicate the conditions in the glitch expression are capable of being satisfied.

10. The system of claim 7, wherein the one or more processing devices, in response to executing the machine-readable instructions, are further configured to generate a cover expression representing additional logic that, when combined to the combinational logic, eliminates glitches introduced by the combinational logic in the output signal.

11. The system of claim 10, wherein the one or more processing devices, in response to executing the machine-readable instructions, are further configured to modify the circuit design to combine the additional logic with the combinational logic.

12. An apparatus comprising at least one computer-readable memory device storing instructions configured to cause one or more processing devices to perform operations comprising:
identifying combinational logic in a circuit design, which is configured to generate an output signal based, at least in part, on an input signal received by the combinational logic and an inversion of the input signal, wherein the output signal generated by the combinational logic is configured to cross between clock domains in the circuit design;
generating a glitch expression based, at least in part, on a configuration of the combinational logic, wherein the glitch expression includes conditions, the satisfaction of which causes the combinational logic to generate the output signal using both the input signal and the inversion of the input signal; and
determining the combinational logic is configured to generate at least one glitch in the output signal based, at least in part, on the glitch expression.

13. The apparatus of claim 12, wherein generating the glitch expression further comprises identifying the conditions, the satisfaction of which causes the combinational logic to generate the output signal using both the input signal and the inversion of the input signal, wherein generating the glitch expression is based, at least in part, on the identified conditions.

14. The apparatus of claim 13, wherein determining the combinational logic is configured to generate at least one glitch in the output signal further comprises:
performing formal verification operations on the glitch expression; and
determining the combinational logic is configured to generate at least one glitch in the output signal when the formal verification operations indicate the conditions in the glitch expression are capable of being satisfied.

15. The apparatus of claim 12, wherein the instructions are configured to cause the one or more processing devices to perform operations further comprising generating a cover expression representing additional logic that, when combined to the combinational logic, eliminates glitches introduced by the combinational logic in the output signal.

16. The apparatus of claim 15, wherein the instructions are configured to cause the one or more processing devices to perform operations further comprising modifying the circuit design to combine the additional logic with the combinational logic.

17. The apparatus of claim 12, wherein the glitch in the output signal is an unintended value-level in the output signal due to differences in signal propagation delay through the combinational logic.

* * * * *